UNITED STATES PATENT OFFICE.

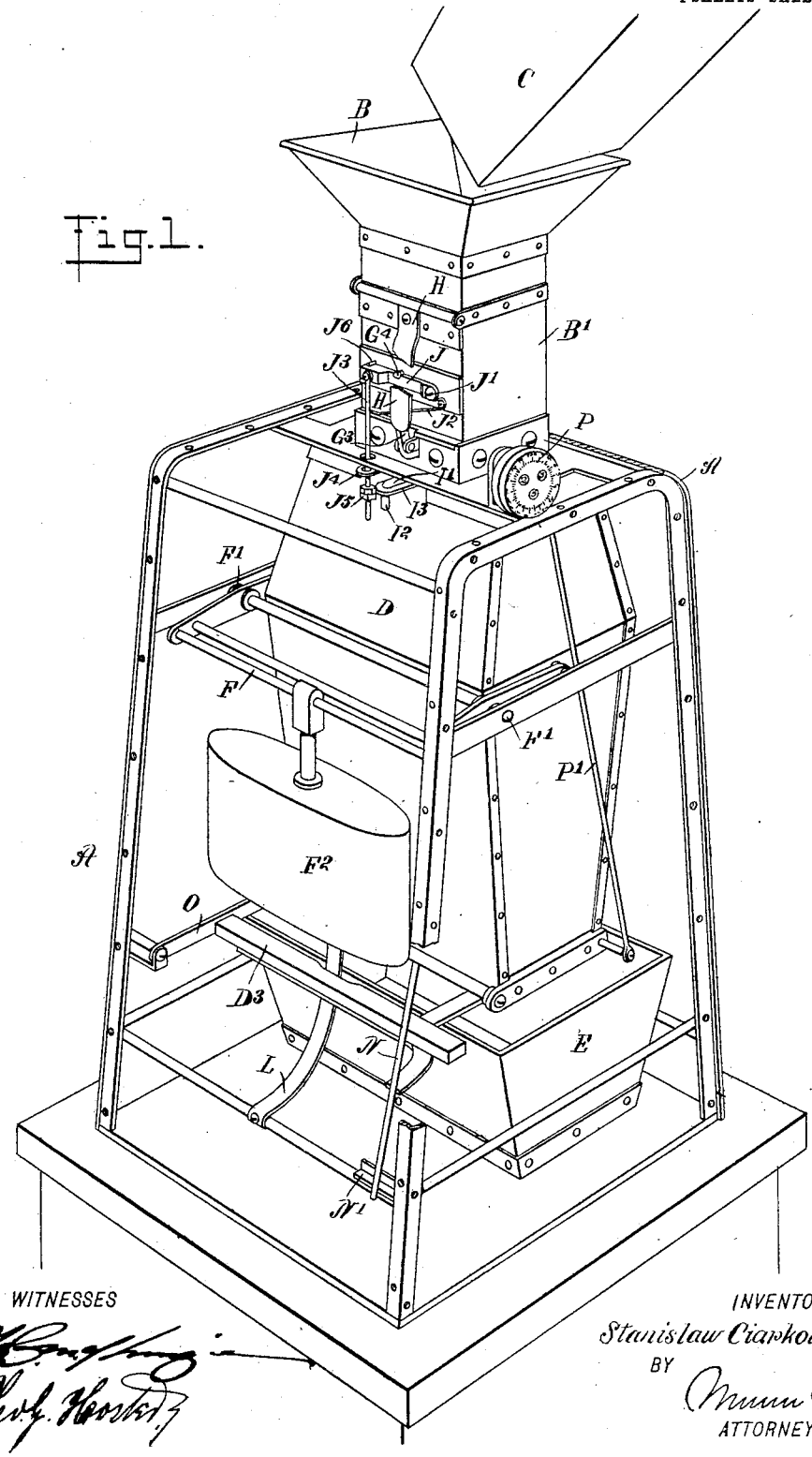

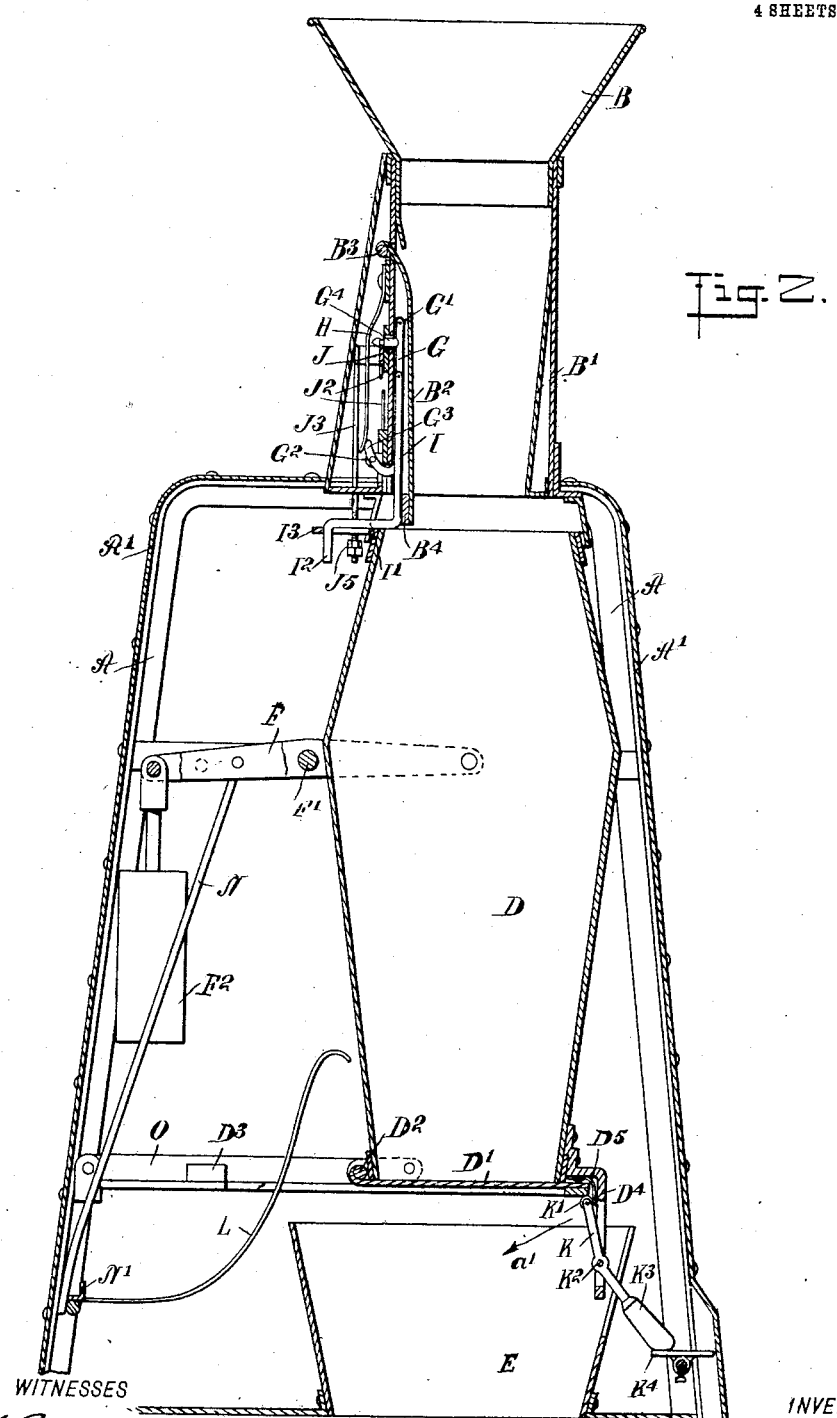

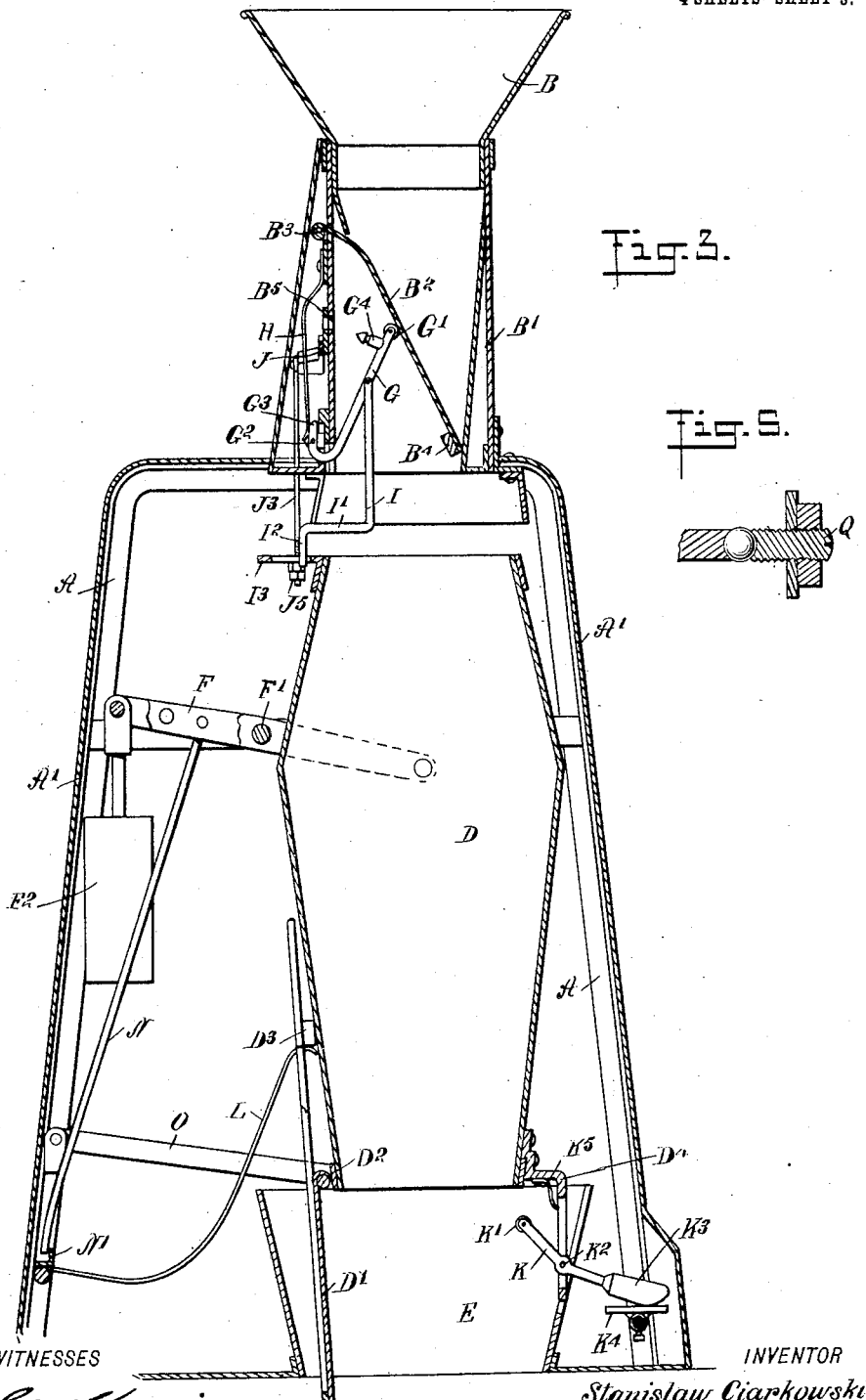

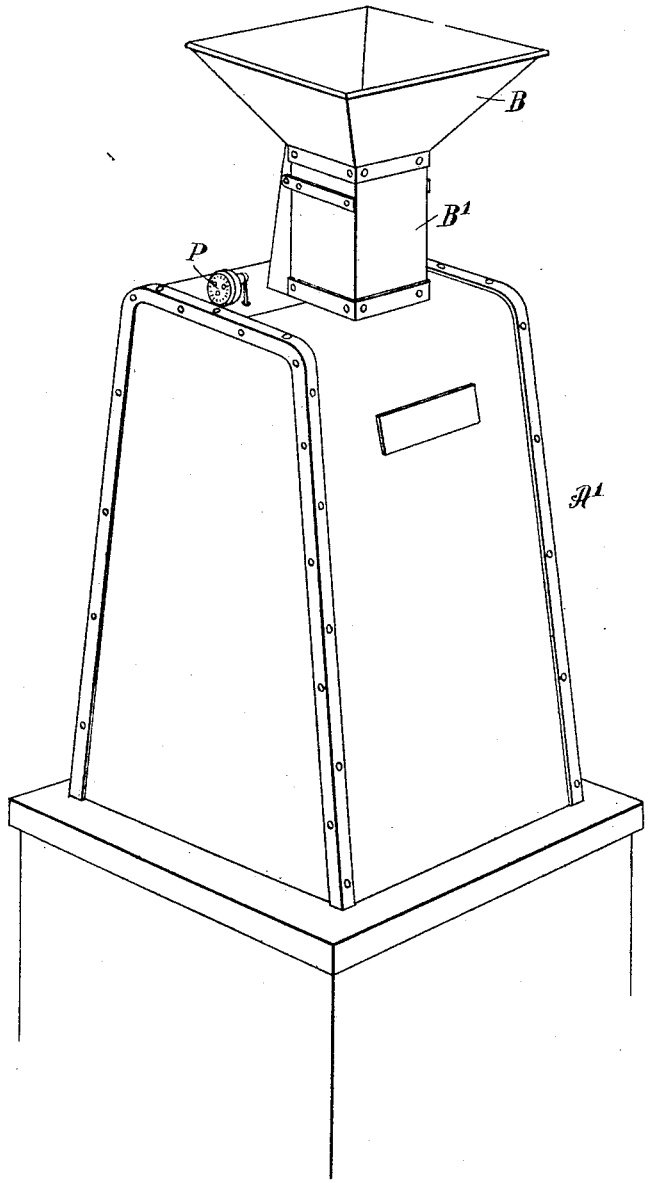

STANISLAW CIARKOWSKI, OF JERSEY CITY, NEW JERSEY, ASSIGNOR OF ONE-FOURTH TO SOFIA K. CIARKOWSKI, OF JERSEY CITY, NEW JERSEY.

AUTOMATIC WEIGHING-MACHINE.

967,868.  Specification of Letters Patent. Patented Aug. 16, 1910.

Application filed September 4, 1909. Serial No. 516,190.

*To all whom it may concern:*

Be it known that I, STANISLAW CIARKOWSKI, a subject of the Czar of Russia, and a resident of Jersey City, in the county of Hudson and State of New Jersey, have invented a new and Improved Automatic Weighing-Machine, of which the following is a full, clear, and exact description.

The object of the invention is to provide a new and improved weighing machine, more especially designed for weighing flour, corn, sugar, coffee, wheat and other materials in loose or granular form, and arranged to permit convenient packaging of the material according to a predetermined weight, and which may also be used for weighing liquids, such as oil and water.

For the purpose mentioned, use is made of a weighing receptacle, hung on a lever carrying an overbalancing weight, the hinged bottom of the receptacle being normally closed and capable of opening on the downward movement of the receptacle to discharge the weighed material contained in the receptacle, the material for filling the receptacle passing from a supply into a fixed hopper having a swing bottom normally open, and adapted to close immediately after the proper amount of material is in the receptacle and the latter starts in a downward direction.

A practical embodiment of the invention is represented in the accompanying drawings forming a part of this specification, in which similar characters of reference indicate corresponding parts in all the views.

Figure 1 is a perspective view of the automatic weighing machine, part of the casing being removed and parts being broken out; Fig. 2 is a sectional side elevation of the same showing the parts in weighing position; Fig. 3 is a like view of the same showing the parts in discharging position; Fig. 4 is a perspective view of the machine, ready for use; and Fig. 5 is a detail view of a form of ball bearing employed and showing the means for adjusting the same.

A suitably constructed frame-work A is covered by a casing A', and on top of the said frame-work A is secured the upwardly-extending outlet B' of a hopper B, into which passes the material to be weighed from a chute C, as indicated in Fig. 1. The outlet B' of the hopper B is preferably rectangular in cross section, and its lower end is above the upper open end of a receptacle D, normally closed by a swing bottom D', and in which accumulates the material until a predetermined weight is reached, the bottom D' then opening to allow the material to pass into a hopper E and to the package for containing the predetermined amount of material.

The receptacle D is hung on a lever F, fulcrumed at F' on the frame-work A, and an overbalancing weight $F^2$ is held on the said lever F to overbalance the receptacle D to such an extent that the receptacle D is held in an uppermost position until a predetermined amount of material has passed into the receptacle D to overbalance the weight $F^2$, so that the receptacle D then moves downward into discharging position, as shown in Fig. 3.

The outlet B' is adapted to be closed by a swing bottom $B^2$, fulcrumed at its upper end at $B^3$ on the outlet B', and the lower free end of the said swing bottom $B^2$ is provided with a weight $B^4$ to normally hold the swing bottom $B^2$ in an open position, as indicated in Fig. 2, and at the time the swing bottom D' is closed, to allow the material to pass from the hopper B through the outlet B' into the receptacle D, to accumulate therein.

The swing bottom $B^2$ is engaged at its under side by a friction roller G', held on one end of a lever G, fulcrumed at $G^2$ on the outlet B' and pressed on at its outer end $G^3$ by a spring H, to cause the lever G to swing the bottom $B^2$ from an open position, as shown in Fig. 2, into a closed position, as indicated in Fig. 3. The lever G is normally held, however, in an approximately vertical position, as indicated in Fig. 2, by the action of a tripping arm I, pivotally connected with the lever G and provided with a horizontal extension I' adapted to be engaged by the upper edge of the receptacle D, so that when the latter is in an uppermost or filling position, as indicated in Fig. 2, the arm I is raised and consequently the lever G is held in vertical position against the tension of the spring H. When the receptacle D moves downward, away from the extension I', then the arm I is released and consequently the spring H imparts a swinging motion to the lever G, so that the latter swings the bottom $B^2$ into the closed position shown in Fig. 3. The outer end of the extension I' of the tripping arm I is provided with a depending offset I² extending into a slotted lug I³, secured to the upper end of the receptacle D, to guide the arm I during the up and down movement of the receptacle D. By the arrangement described, the arm I is held against sidewise movement, but free to move up and down.

On the lever G, adjacent to the friction roller G', is secured or formed a grooved locking head G⁴, adapted to pass through an opening B⁵ in the wall of the outlet B' to the outside thereof, at the time the lever G is in vertical position, as indicated in Fig. 2. The groove of the head G⁴ is adapted to be engaged by a locking arm J, fulcrumed at J' on the outlet B' (see Fig. 1), and the locking arm J is pressed on by a spring J², to normally hold the locking arm J in engagement with the groove of the head G⁴, to hold the latter in place and thus lock the lever G in the vertical position referred to. From the free end of the locking arm J depends a rod J³, passing through an apertured lug J⁴, secured to the upper end of the receptacle D, and on the lower threaded end of the rod J³ screw nuts J⁵, adapted to be engaged by the lug J⁴, shortly after the receptacle D starts on its downward movement, whereby the rod J³ is pulled downward, and swings the locking arm J in a like direction, to disengage the head G⁴, thereby unlocking the lever G. At the same time the receptacle D releases the extension I' of the tripping arm I, so that the spring H imparts a swinging motion to the lever G, and the latter thus swings the bottom B² into the closed position indicated in Fig. 3. When the receptacle D returns to its uppermost position, the lug J⁴ moves out of contact with the nuts J⁵, so that the spring J² imparts an upward return swinging motion to the locking arm J, so that the latter again engages the groove of the head G⁴ as soon as the lever G swings back into vertical position by the action of the tripping arm I. The upward swinging movement of the locking arm J is limited by a stop pin J⁶ (see Fig. 1).

The swing bottom D' of the receptacle D is fulcrumed at D² on the lower end of the receptacle D, and the said swing bottom D' is overbalanced by a weighted arm D³, to normally hold the swing bottom D' in a closed position. The free end of the swing bottom D' is adapted to be engaged by the friction roller K' of a locking lever K, fulcrumed at K² on a bracket D⁴ carried by the receptacle D, and the lever K is provided with a weighted arm K³, engaging a regulator K⁴ adjustable on the framework A. Now when the receptacle D is in filling position, as shown in Fig. 2, the swing bottom D' is held in a closed position by the action of its weighted arm D³ and is locked in the closed position by the lever K, to sustain the weight of the material accumulating in the receptacle D. Now when the receptacle D moves downward and the filling of the receptacle D ceases by the swing bottom B² moving into closed position, then a swinging motion is given to the lever K in the direction of the arrow a' (see Fig. 2), whereby the weighted arm K³ is swung upward out of engagement with the shelf K⁴. The material on the bottom D' now overbalances the weighted arm D³ and the weighted lever K, so that the bottom D' swings into an open position, thereby discharging the material from the receptacle D into the hopper E and into the package held at the lower end of the hopper E. A spring D⁵ on the bracket D⁴ presses against the friction roller K', to start the lever K on its swinging movement in the direction of the arrow a', as soon as the receptacle D begins to move downward, so that a proper release of the bottom D' takes place. When the bottom D' swings into an open approximately vertical position, as indicated in Fig. 3, the weighted arm D³ engages with its under side the free end of a spring L attached to the framework A, to hold the bottom D' in open position until all the material has passed out of the receptacle D, it being understood that as the pressure of the material on the bottom D' decreases the latter would tend to close unless held open by the spring L, as above mentioned. After the material is discharged from the receptacle D, the latter begins to move upward by the action of the overbalancing weight F², whereby the weighted arm D³ moves away from the free end of the spring L so that the swing bottom D' is released and now swings shut by the action of its weighted arm D³. The swing bottom D' in its closing movement passes the friction roller K', and the latter moves under the free end of the swing bottom D' immediately after the swing bottom D' has reached its final closing position.

In order to prevent the receptacle D from returning to its uppermost position by the action of the weight F², a sustaining rod N is provided, fulcrumed on the lever F and adapted to be seated at its free end on a shelf N' secured to the frame-work A. When the receptacle D is in an uppermost position, as shown in Fig. 2, the free end of the sustaining rod N is below the shelf N', but when the receptacle D swings downward, the sustaining rod N is raised by the lever F, and in doing so its free end moves above the top of the shelf N', as shown in Fig. 3 in a position to prevent the receptacle D from moving into its uppermost position until all the material has been discharged from the receptacle and the bottom D' is closed. When the receptacle D is in its lowermost position and the material is discharged, the receptacle D has a slight upward movement, under the action of the weight F² sufficient to release the weighted arm D³ from the spring L, to allow the bottom D' to swing into closed position. Now when the bottom D' swings into a closed position, as above explained, its arm D³ strikes the sustaining rod N, and swings the same outward to dislodge the lower end of the sustaining rod N from the shelf N', thus allowing the receptacle D to return to an uppermost position. Guide links O connect the lower end of the receptacle D to the frame-work A, to hold the receptacle D against undue swinging movement. A recording device P, of any approved construction is mounted on the frame-work A and is connected by an operating rod P' with the receptacle D, so that the weight is registered in the usual manner.

In order to reduce to a minimum the friction of the various swinging parts and to insure easy swinging movement of said parts, I employ ball bearings, an example of which is shown in Fig. 5 of the drawings, wherein it will be seen that should necessity arise, said bearings may be readily adjusted as desired by means of a screw Q, which enters the raceway for the bearing balls and may be made to bear more or less upon said balls as may be found desirable.

The operation is as follows: The material passes in a continuous stream from the chute C to the hopper B, and from the latter into the receptacle D, at the time the parts are in the filling position shown in Fig. 2, that is, with the bottom B² in open position and the bottom D' in closed position. When the desired amount of material, corresponding to the weight F², has accumulated in the receptacle D then the latter overbalances the weight F² and the receptacle D moves downward, whereby the bottom B² is caused to swing into a closed position, as previously explained, to shut off the material from the receptacle D and to allow the material to accumulate in the outlet B' of the hopper B. The bottom D' of the receptacle D next swings open, as previously explained, and the bottom is locked in open position for the time being, while at the same time the receptacle D is locked in a lowermost position by the sustaining rod N. As soon as the bottom D' swings open, the material passes out of the receptacle into the hopper E, to be packaged, and after the material has been discharged from the receptacle D, the overbalancing lever F returns the receptacle D into uppermost position, and in doing so, the bottom D' swings shut, the sustaining rod N is moved into inactive position and the lever G is returned to vertical position and locked therein by the locking arm J, so that the swing bottom B² can swing back into open position, aided by the material which has accumulated in the outlet B' during the discharging of the material from the receptacle D. Thus by the arrangement described accurate weighing of the material takes place, and sufficient time is given for removing a filled package and placing an empty package again in position at the hopper E, while the material passes in a continuous stream from the chute C into the hopper B.

By the use of the machine herein shown and described, the weight of materials from one ounce to one thousand or more pounds may be ascertained. When the cover of the casing is in place, the scale and all its parts are rendered dust-proof and are protected from rust. Furthermore, trouble with the ball-bearings is avoided, as the necessary adjustment may be made as occasion requires. The bearings employed in this machine are of the ball-bearing type, to reduce friction to a minimum, and to assure at all times an accurate working of the machine.

Having thus described my invention, I claim as new and desire to secure by Letters Patent:

1. An automatic weighing machine, comprising a stationary hopper for receiving the material to be weighed, and provided with a hinged bottom normally open, a receptacle below the said hopper and having an open top and a hinged overbalanced bottom normally closed, a lever on which the said receptacle is hung, a weight carried by the said lever to normally hold the said receptacle in an uppermost filling position, actuating means controlled by the said receptacle for closing the said hopper bottom on the descent of the said receptacle, a locking device for holding the actuating means in inactive position, means controlled by the receptacle for releasing the locking device, and locking means for normally locking the said receptacle bottom against opening, the said locking means being controlled by the descent of the said receptacle to unlock the receptacle bottom for the latter to swing open.

2. An automatic weighing machine provided with an overbalanced receptacle capable of moving up and down and having an overbalanced hinged bottom, locking means for normally locking the said bottom against opening at the time the receptacle is in raised position and for unlocking the said bottom on the descent of the receptacle, and a spring fixed at one end and adapted to engage the said bottom at the time the said bottom is in open discharging position.

3. An automatic weighing machine provided with a receptacle capable of moving up and down and having an overbalanced hinged bottom, a weighted lever on which the receptacle is hung, means for engagement by the said swing bottom to hold the latter open when the receptacle is in a lowermost position, a device connected with the weighted lever, and a support adapted to be engaged by said device for temporarily locking the said receptacle in discharging position.

4. An automatic weighing machine provided with an over-balanced receptacle capable of moving up and down and having an overbalanced hinged bottom, a weighted locking lever adapted to engage the free end of the said receptacle bottom to hold the latter in closed position, a fixed rest for engagement by the said locking lever on the descent of the said receptacle, and a spring fixed at one end and adapted to engage with its free end the said receptacle bottom to hold the latter in open position.

5. An automatic weighing machine provided with an overbalanced receptacle capable of being moved up and down and having an overbalanced hinged bottom, locking means for normally locking the said bottom against opening at the time the receptacle is in raised position and for unlocking the said bottom on the descent of the receptacle, a spring fixed at one end and adapted to engage the said bottom at the time the said bottom is in open discharging position, an overbalanced lever on which the said receptacle is hung, a fixed hopper having an inclined hinged bottom normally open and adapted to close the hopper, the latter discharging into the open upper end of the receptacle, a spring-pressed lever on the hopper and engaging the said hopper bottom for swinging the latter open, and a rod connected with the said spring-pressed lever and adapted to be engaged by the said receptacle in its upward movement.

6. An automatic weighing machine provided with an overbalanced receptacle capable of being moved up and down and having an overbalanced hinged bottom, locking means for normally locking the said bottom against opening at the time the receptacle is in raised position and for unlocking the said bottom on the descent of the receptacle, a spring fixed at one end and adapted to engage the said bottom at the time the said bottom is in open discharging position, an overbalanced lever on which the said receptacle is hung, a fixed hopper having an inclined hinged bottom normally open and adapted to close the hopper, the latter discharging into the open upper end of the receptacle, a spring-pressed lever on the hopper and engaging the said hopper bottom for swinging the latter open, means controlled by the receptacle for swinging the said spring-pressed lever into open dormant position, and a locking device controlled by the said receptacle for locking the said spring-pressed lever in dormant position.

7. An automatic weighing machine provided with an overbalanced receptacle capable of being moved up and down and having an overbalanced hinged bottom, locking means for normally locking the said bottom against opening at the time the receptacle is in raised position, and for unlocking the said bottom on the descent of the receptacle, a spring fixed at one end and adapted to engage the said bottom at the time the said bottom is in open discharging position, an overbalanced lever on which the said receptacle is hung, a fixed hopper having an inclined hinged bottom normally open and adapted to close the hopper, the latter discharging into the open upper end of the receptacle, a spring-pressed lever on the hopper and engaging the said hopper bottom for swinging the latter open, the said spring-pressed lever having a locking head, a locking arm mounted to swing and adapted to engage the said head, the said locking arm having a depending rod, a nut screwing on the said rod, and an apertured lug on the said receptacle and through which extends the said rod.

8. An automatic weighing machine provided with an overbalanced receptacle capable of moving up and down and having an overbalanced hinged bottom, locking means for normally locking the said bottom against opening at the time the receptacle is in raised position and for unlocking the said bottom on the descent of the receptacle, a spring fixed at one end and adapted to engage the said bottom at the time the said bottom is in open discharging position, an overbalanced lever on which the said receptacle is hung, a sustaining rod pivoted on the said lever and adapted to be engaged by the said receptacle bottom, and a fixed rest for the said rod to rest on to lock the receptacle temporarily in discharging position.

9. An automatic weighing machine provided with an overbalanced receptacle capable of being moved up and down, a hopper above the open upper end of the said receptacle and provided with a hinged bottom inclined when in closed position and approximately vertical in open position, an actuating lever mounted to swing on the said hopper and engaging with one end the under side of the said bottom, a spring pressing the other end of the said lever, and a tripping rod connected with the said actuating lever and adapted to be engaged by the said receptacle on the upward movement thereof.

10. An automatic weighing machine provided with an overbalanced receptacle capable of being moved up and down, a hopper above the open upper end of the said receptacle and provided with a hinged bottom inclined when in closed position and approximately vertical in open position, an actuating lever mounted to swing on the said hopper and engaging with one end the under side of the said bottom, a spring pressing the other end of the said lever, a tripping rod connected with the said actuating lever and adapted to be engaged by the said receptacle on the upward movement thereof, a head on the under side of the said bottom, a spring-pressed locking arm on the hopper for the said head, and means controlled by the said receptacle for disengaging the said locking arm from the said head.

11. An automatic weighing machine provided with an overbalanced receptacle capable of being moved up and down, a hopper above the open upper end of the said receptacle and provided with a hinged bottom inclined when in closed position and approximately vertical in open position, an actuating lever mounted to swing on the said hopper and engaging with one end the underside of the said bottom, a spring pressing the other end of the said lever, a tripping rod connected with the said actuating lever and adapted to be engaged by the said receptacle on the upward movement thereof, and guiding means on the said receptacle for the said tripping rod.

12. An automatic weighing machine having a receptacle provided with a swing bottom for closing the lower end of the said receptacle, the said swing bottom having a weighted arm for normally holding the said swing bottom closed, a weighted lever on which the said receptacle is hung, a spring adapted to be engaged by the weighted arm of said swing bottom to temporarily hold the said swing bottom in open position, and means for temporarily locking the said receptacle in lowermost discharging position.

13. An automatic weighing machine having a receptacle provided with a gravity swing bottom for closing the lower end of the said receptacle, a weighted lever on which the said receptacle is hung, and a locking lever having a roller at its end adapted to engage the free end of the swing bottom to temporarily lock the said swing bottom against opening, and a fixed means for engagement by the said locking lever to unlock the swing bottom on the descent of the said receptacle.

14. An automatic weighing machine having a receptacle provided with a gravity swing bottom for closing the lower end of the said receptacle, a weighted lever on which the said receptacle is hung, a bracket carried by the receptacle, and a locking lever fulcrumed on the bracket for temporarily locking the said swing bottom against opening, the said locking lever having a weighted arm, a fixed means for engagement by the weighted arm of said locking lever to unlock the swing bottom on the descent of the said receptacle, and a spring on the said bracket for pressing the said locking lever to start the lever on its swinging movement as soon as the receptacle begins to move downward.

15. An automatic weighing machine having a receptacle provided with a gravity swing bottom for closing the lower end of the said receptacle, a weighted lever on which the said receptacle is hung, a spring for engagement by the said swing bottom to hold the latter open as long as the receptacle is in a lowermost position, a sustaining rod on the said lever, and a rest for the said rod to temporarily lock the receptacle in a lowermost position, the said swing bottom on closing engaging the said rod and moving it off the said rest.

In testimony whereof I have signed my name to this specification in the presence of two subscribing witnesses.

STANISLAW CIARKOWSKI.

Witnesses:
 THEO. G. HOSTER,
 JOHN P. DAVIS.